Jan. 5, 1937.　　　G. H. WILLIAMS　　　2,066,956
AUTOMATIC COUPLING
Filed May 9, 1936　　　2 Sheets-Sheet 1
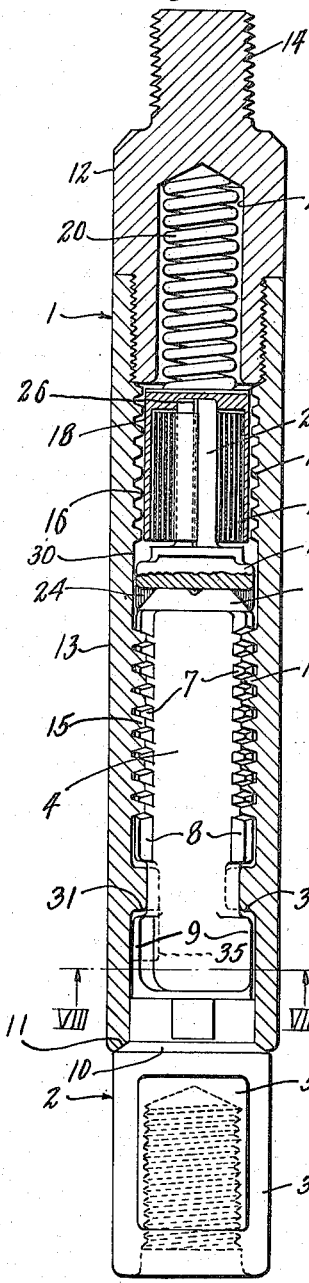
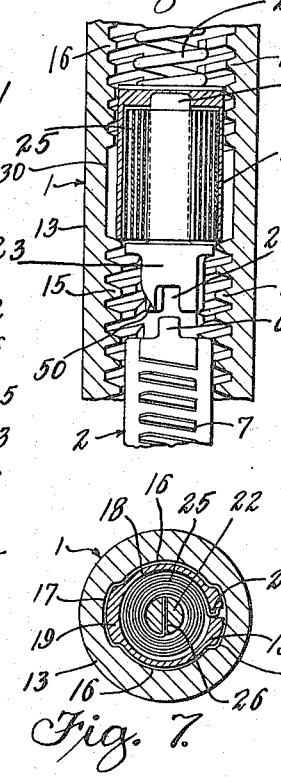
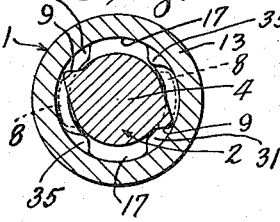
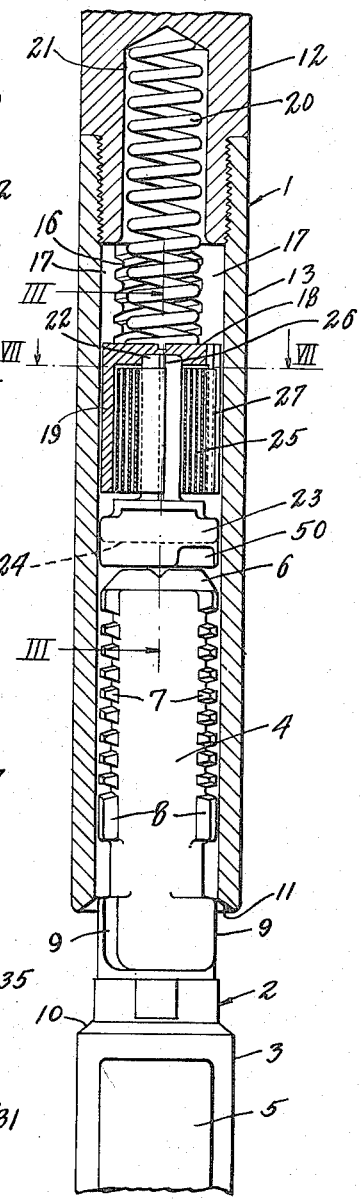
INVENTOR.
Glynn H. Williams
BY Lyon & Lyon
ATTORNEYS

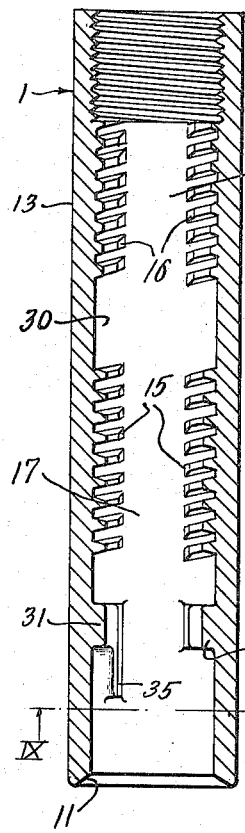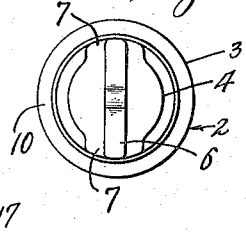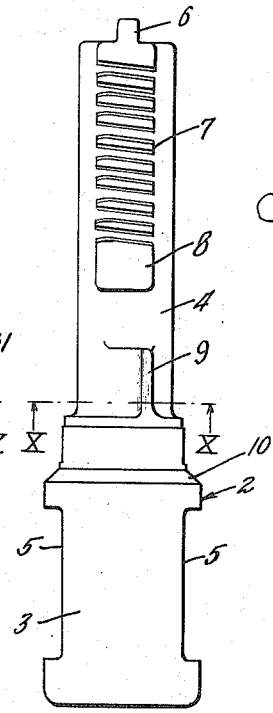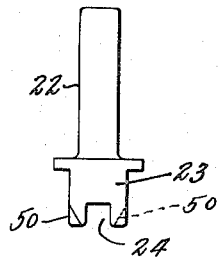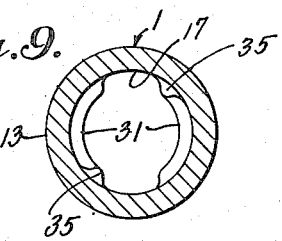

Patented Jan. 5, 1937

2,066,956

UNITED STATES PATENT OFFICE 2,066,956

AUTOMATIC COUPLING

Glynn H. Williams, Huntington Park, Calif., assignor to Axelson Manufacturing Co., Los Angeles, Calif., a corporation of California Application May 9, 1936, Serial No. 78,835

10 Claims. (Cl. 287—103)

This invention relates to coupling mechanisms and particularly to couplings for connecting rods and the like exposed to longitudinal stresses but not exposed to torsional stresses of appreciable magnitude. The invention is particularly useful for use in inaccessible locations such as devices for connecting the lower ends of strings of sucker rods to pump plungers in wells.

A broad object of the invention is to provide a coupling that can be actuated by applying a twisting strain thereto in only one direction and which at the same time will resist high tensile and compressive strains without lost motion when engaged.

Various specific objects and features of the invention will appear from the detailed description which refers to the drawings.

The invention being particularly useful in connecting sucker rods to pump plungers, it will be described in detail with reference to such use, but it is to be understood that the invention has other fields of usefulness and it is to be limited only to the extent set forth in the appended claims.

In the drawings:

Fig. 1 is a vertical sectional view through a coupling in accordance with the invention, the two members of the coupling being in engaged or interlocked relation;

Fig. 2 is a vertical sectional view through the coupling with the two members partly separated, the upper member being rotated 90° from the position shown in Fig. 1;

Fig. 3 is a detailed sectional view taken in the plane III—III of Fig. 2, this plane being at right angles to the plane of the section of Fig. 2;

Fig. 4 is a vertical sectional view of the tubular portion of the upper member of the coupling shown in Fig. 1;

Fig. 5 is a side elevational view of the lower member of the coupling taken at right angles to the views shown in Figs. 1 and 2;

Fig. 6 is a top or plan view of the element shown in elevation in Fig. 5;

Fig. 7 is a cross section taken in the plane VII—VII of Fig. 2;

Fig. 8 is a cross section taken in the plane VIII—VIII of Fig. 1;

Fig. 9 is a cross section taken in the plane IX—IX of Fig. 4;

Fig. 10 is a cross section taken in the plane X—X of Fig. 5;

Fig. 11 is an elevational view of one element of the upper member of the coupling; and Fig. 12 is a bottom end view of the element shown in elevation in Fig. 11.

Referring first to Fig. 1, a coupling in accordance with the invention adapted for connecting the lower end of a string of sucker rods to a pump plunger comprises an upper member 1 adapted to be screwed onto the lower end of a string of sucker rods, and a lower element 2 (shown to best advantage in Fig. 5) adapted to be screwed onto the upper end of a pump which is to be actuated by the sucker rods.

The lower member 2 comprises a base portion 3 having internal screw threads for threadedly attaching the base to a pump to be actuated and having a pin 4 extending upwardly therefrom. The base 3 may be provided with wrench flats 5 thereon to facilitate screwing the base onto the pump. The pin 4 is provided with a tongue 6 on its outer end, the function of which will be described later, and is provided with interrupted threads 7 on opposite sides, these threads being of the type employed on breech blocks of guns. Threads 7 are left-hand threads. As shown in Fig. 6, the threads 7 extend out a substantial distance from the pin 4. The pin is also provided with blocks or shoulders 8 of substantial dimensions just below the threads 7, these blocks 8 having the same circumferential dimensions as the threads 7. A pair of shoulders 9 are also provided on the pin 4 substantially at the base thereof, the shoulders 9 being tapered on one side, as shown clearly in Fig. 8. The other side of the shoulders 9 is fairly abrupt and is in alignment with one edge of block 8 and threads 7. The base 3 is provided with a seat 10 which is engaged by a cooperating seat 11 (Fig. 4) on the upper coupling member 1.

Upper coupling member 1 comprises a shell or casing consisting of an upper end member 12 which carries right-hand screw threads 14 for connection to the lower end of a string of sucker rods, and a tubular member 13. Member 13 is internally threaded at the upper end and the lower end of the end member 12 is reduced in size and externally threaded to screw into the upper end of member 13. The two members 12 and 13 are made separately to facilitate manufacturing operations but these members are never disconnected in use.

The tubular member 13 is provided with interrupted threads 15 on its inner surface, these threads being so dimensioned as to cooperate with the interrupted threads 7 on the pin 4. The tubular member of sleeve 13 is also provided with interrupted threads 16 positioned above and spaced from the threads 15 but threads 16 are incidental and do not function as threads in the operation of the device. It is necessary in cutting the threads 15 to also cut the threads 16 since the threads are cut by means of a tap introduced through the upper end of sleeve 13. The threads 15 and also the threads 16 are separated by grooves 17 which function as guides for other elements of the coupling.

It will be observed that the internal diameter of the threads 16 is greater than that of the threads 15. This is to provide room for a cage 18 which is longitudinally slidably supported within the upper part of sleeve 13. However, the cage 18 is provided with longitudinal ridges 19 which fit into the groove 17 and prevent relative rotation between the cage 18 and the sleeve 13. Cage 18 is therefore free to slide vertically from an upper position as shown in Fig. 1 to a lower position as shown in Fig. 3 (in which the cage is restrained against further downward movement by contact with the upper ends of the threads 15) but is restrained against rotation either to the right or to the left with respect to the sleeve 13. The sleeve 18 is constantly urged toward its lowermost position by a helical compression spring 20 mounted in a recess 21 provided therefor in the upper end member 12.

Centrally positioned within the cage 18 is a spindle 22 having on its lower end, which projects out of the cage 18, an enlarged base 23 dimensioned to fit into the grooves 17 and be guided thereby during a part of its travel with the cage 18. Base 23 is provided with a transverse groove 24 in its lower end dimensioned to receive the tongue 6 on the upper end of pin 4. The spindle 22 is free to rotate with respect to the cage 18 but has a torque constantly applied thereto by a spiral spring 25 of the type employed as main springs in clocks and the like. Thus the inner end of the spring 25 is bent to hook into a slot 26 in the spindle 22 and the outer end of the spring is hooked to engage the edge 27 of a slot in the housing 18. As shown clearly in Fig. 7, the spring 25 constantly urges the spindle 22 in clockwise direction with respect to the housing 18.

In use, the member 2 is secured to a pump and the latter installed in a well. The member 1 is then screwed onto the lower end of a string of sucker rods and lowered into the well until it rests upon the member 2 on the top of the pump. The opening in the lower end of the sleeve 13 is of such dimensions as to readily slip over the pin 4 and, if the interrupted threads 7 on the pin 4 are in alignment with the grooves 17 in the sleeve 13, the upper member 1 will slip down over the pin 4, as shown in Fig. 2. However, if the member 13 should not be so oriented as to align the grooves 17 therein with the interrupted threads 7 on pin 4, then the member 13 will come to rest with the shoulders 31 resting upon the uppermost of threads 7. However, the elements may then be quickly brought into alignment by a slight rotation of the sucker rod string, the member 1 dropping down onto the member 2 as soon as the parts are in proper alignment.

The weight of a long string of sucker rods is such that when the member 13 is properly aligned with the pin 4 the upper member immediately drops into full seating position on the member 2 in which the seating surfaces 10 and 11 are in contact. However, several operations take place during movement of the sleeve 13 from the position shown in Fig. 2 to the position shown in Fig. 1. Thus it will be observed that in Fig. 2 the tongue 6 on pin 4 is just about to be engaged in the groove 24 in the spindle 22. Engagement of these parts must necessarily result because the pin 4 must be so aligned with the sleeve 13 that the interrupted threads 7 lie in the grooves 17 and the ends of the spindle base 23 are likewise retained in the grooves in that portion of the grooves 17 between the interrupted threads 15 as shown in Fig. 3.

Therefore, as downward motion of the sleeve 13 continues, the tongue 6 enters the slot or groove 24, interlocking the pin 4 and the spindle 22 against relative rotation. In response to further downward movement of sleeve 13, the upper end of the pin 4 forces the spindle 22 and the cage 18 upwardly, compressing the spring 20. All this time the spring 25 is urging the spindle 22 in a clockwise direction with respect to the sleeve 13. When the base 23 rises above the threads 15, it is free to rotate in the enlarged circular chamber 30 between the threads 15 and 16. However, the spindle cannot rotate immediately for the reason that it is locked by the tongue 6 and groove 24 against rotation with respect to the pin 4 and relative rotation between pin 4 and sleeve 13 is prevented by virtue of the fact that the guide blocks 8 on the pin 4 are riding against the edges of guide shoulders 31 in the sleeve 13 positioned below the interrupted threads 15 and in alignment therewith. These shoulders 31, however, are so dimensioned longitudinally with respect to the longitudinal dimensions of the blocks 8 that when the sleeve 13 has been moved downwardly to a point where the leading ends of the interrupted threads 7 are juxtaposed to the leading ends of the grooves of the threads 15, the upper ends of the shoulders 31 can slip past the lower edges of the blocks 8.

The spiral spring 25 acting through the spindle 22 and the pin 4 then rotates the sleeve 13 (and the sucker rod string connected thereto) to the left or in a counter-clockwise direction, causing the interrupted threads 15 to screw onto the interrupted threads 7 and clamp the seat 11 on sleeve 13 tightly against the seat 10 on the base 3. Longitudinal separating movement of the two members is then prevented by the interengaged threads 7 and 15 and inward movement is prevented by contacting of the seats 10 and 11. It should be noted that the spring 25 is fairly stiff and may rotate the sleeve 13 even though the upper end of the string of sucker rods be held against rotation. However, to insure proper operation, the sucker rods may be rotated to the left by applying thereto a very light torque much less than that necessary to unscrew the joints.

After the coupling members are interlocked as described, they will resist any longitudinal strains that may be placed thereon and function the same as any other type of coupling.

If it is desired to disconnect the coupling whereby the sucker rod string may be withdrawn from the well without at the same time removing the pump, disconnection is effected by simply rotating the sucker rod string to the right or in a clockwise direction while supporting the weight of the sucker rods from the surface. The resultant rotation of the sleeve 13 disengages the threads 15 from the threads 7, permitting the sleeve 13 to be lifted off of the pin 4. To limit rotary movement in a clockwise direction of the sleeve 13 with respect to the pin 4, the shoulders 31 are provided with lower extensions 35 which, when the sleeve 13 is in lowermost position as shown in Fig. 1, contact the shoulders 9 on the pin 4 which were previously mentioned. This positively prevents rotary movement of the sleeve 13 through an angle greater than that necessary to align the interrupted threads 7 of the grooves 17.

The lower ends of the shoulders 35 in sleeve 13 and the shoulders 9 on the pin 4 are purposely made narrow circumferentially instead of full width like the blocks 8 to permit whatever rotary movement may be necessary to fully interlock the threads 7 with the threads 15 and bring the seating surfaces 10 and 11 tightly together. Normally the tool is so designed that rotation through only 90° is sufficient to fully lock the tool. However, it is quite possible that in the event of wear of the threads or of the seats 11 or 10, slightly more than 90° movement might be necessary to interlock the members and, by cutting away the shoulders 9 and 35 as shown, whatever additional movement that may be ultimately required is provided for.

When the threads in sleeve 13 are disengaged from the threads on the pin 4 by rotation of the sleeve to the right, the sleeve is urged upwardly away from the pin by the force of the helical spring 20 acting through the cage 18 and the spindle 22 upon the upper end of the pin 4. As the cage 18 is moved downwardly within the sleeve by the spring 20, the elongated lower end 23 of the spindle 22 again enters the grooves 17 between the interrupted threads 15, thereby preventing rotation of the spindle 22 by the spring 25 after the tongue 6 on pin 4 leaves the groove 24 in the spindle 22. To insure entry of the spindle base 23 into the grooves 17 past the ends of the uppermost threads 16, the edges of the base member 23 are chamfered as indicated at 50.

It is customary to join the various sections of sucker rods together by right-hand screw threads. Therefore, any coupling member the actuation of which requires twisting of the sucker rod string to the left is objectionable because of the possibility of loosening sucker rod joints. It will be observed that in the tool described the only twisting movement ever required to actuate the coupling member is clockwise in direction, which movement tends to tighten the screw joints between the sucker rods rather than to loosen them.

As previously indicated, the invention has been described with reference to a particular embodiment for use in wells to connect a sucker rod string to a pump. Obviously the coupling may be employed for connecting other types of objects and its use is therefore not restricted to sucker rods and pumps. Furthermore, various modifications may be made in the specific structure shown without departing from the invention and the latter is therefore to be limited only as set forth in the appended claims.

I claim:

1. In a coupling of the type described, a sleeve member and a pin member insertable into the sleeve member, cooperating shoulders on said members so dimensioned and oriented as to permit entry of the pin member into the sleeve member when the members are in one position of relative orientation and to lock the members together when the pin member is rotated in one direction with respect to the sleeve member after entry thereinto, spring means on one of said members for rotating said pin member in said one direction with respect to said sleeve member to engage said shoulders and control means for normally restraining said spring means, said control means being releasable in response to entry of said pin member into said sleeve member whereby said spring member is automatically released to relatively rotate said members into locking position following entry of said pin member into the sleeve member.

2. In a coupling of the type described, a sleeve member and a pin member insertable into the sleeve member, cooperating shoulders on said members so dimensioned and oriented as to permit entry of the pin member into the sleeve member when the members are in one position of relative orientation and to lock the members together when the pin member is rotated in one direction with respect to the sleeve member after entry thereinto, spring means in said sleeve member for rotating said pin member in said one direction with respect to said sleeve member to engage said shoulders and control means for normally restraining said spring means, said control means being releasable in response to entry of said pin member into said sleeve member whereby said spring member is automatically released to relatively rotate said members into locking position following entry of said pin member into the sleeve member.

3. In a coupling of the type described, a sleeve member and a pin member insertable into the sleeve member, cooperating interrupted screw cams on said members so dimensioned and oriented as to permit entry of the pin member into the sleeve member when the members are in one position of relative orientation and to lock the members together when the pin member is rotated in one direction with respect to the sleeve member after entry thereinto, spring means in said sleeve member for rotating said pin member in said one direction with respect to said sleeve member to engage said cams and control means for normally restraining said spring means, said control means being releasable in response to entry of said pin member into said sleeve member whereby said spring member is automatically released to relatively rotate said members into locking position following entry of said pin member into the sleeve member, said control means including a longitudinally movable stop element on said spring means and a cooperating stop element on said sleeve member, and other spring means for normally maintaining said movable stop element in engagement with said cooperating stop element, said movable stop element being positioned to be intercepted and moved longitudinally out of engagement with said cooperating stop element by the pin member when the latter enters the sleeve member.

4. A coupling mechanism of the type described in claim 1, with guide means on said members for preventing relative rotation therebetween away from said one position of relative orientation during entering movement of the pin member into said sleeve member.

5. A coupling mechanism as described in claim 1, in which said interrupted shoulders consist of screw cams and in which said pin member is provided with a base having an annular seat thereon and said sleeve member is provided with an annular seat on the lower end thereof adapted to engage with said seat on said pin base and be interlocked thereagainst in response to interengagement of said interrupted screw cams.

6. A coupling mechanism of the type described comprising a pair of members, one of which includes a pin having an external interrupted shoulder thereon and the other of which includes a hollow sleeve open at one end to receive said pin and having internal interrupted shoulder therein adapted to interlock with the shoulder of said pin, interengaging elements on the end of said pin and within said sleeve, respectively, adapted to interlock when pressed together whereby relative rotation therebetween is prevented, one of said interengaging elements being fixed with respect to its associated member and the other interengaging element being longitudinally and rotatably slidably supported with respect to its associated member, spring means for urging said other element outwardly with respect to its associated member and applying twisting torque thereto, stop means for restraining rotation of said other element by said spring when the latter is in outermost position and thereby retain it in position to interlock with the fixed element on the other member when said members are so oriented as to disengage their interrupted shoulder, and said stop means being dimensioned to disengage said other element and permit relative rotation between said members for interlocking said interrupted shoulders in response to predetermined inward movement of said other element by said one element.

7. A coupling of the type described comprising a pair of members, one of which consists of a pin having an external interrupted shoulder thereon and the other of which includes a hollow sleeve open at one end for receiving said pin and having an internal interrupted shoulder thereon adapted to interlock with the interrupted shoulder of said pin, interengaging elements on the end of said pin and within said sleeve, respectively adapted to interlock when pressed together whereby relative rotation therebetween is prevented, the element on said pin being fixed with respect thereto and the element in said sleeve being longitudinally and rotatably slidably supported within said sleeve, spring means within said sleeve for urging said element associated therewith outwardly and simultaneously applying twisting torque thereto, and stop means for restraining rotation of the element within said sleeve when the element is in outermost position and thereby retain said element in position to interlock with the fixed element on the pin member when said members are so oriented relative to each other as to disengage their interrupted shoulder, said stop means being dimensioned to disengage said element in said sleeve and permit said spring means to rotate said sleeve about said elements and said pin for interlocking said interrupted shoulders, when the element in said sleeve is pressed inwardly a predetermined distance by said pin member.

8. A coupling mechanism as described in claim 7, in which said spring means includes a helical compression spring for urging the element in said sleeve outwardly therefrom and a spiral torsion spring for urging said element to rotate with respect to said sleeve.

9. A coupling mechanism as described in claim 7 in which said stop means includes a shoulder in said sleeve adapted to engage said rotatable element therein when the latter is in outermost position, and additional stop means on said pin member and said sleeve member, respectively, adapted to interengage and prevent relative rotation between said pin and sleeve by said spring, following disengagement of said first mentioned stop means and pending full entry of the pin into the sleeve.

10. In a coupling of the type described, a sleeve member and a pin member insertable into the sleeve member, cooperating interrupted shoulders on said members so dimensioned and oriented as to permit entry of the pin member into the sleeve member when the members are in one position of relative orientation and to lock the members together when the pin member is rotated in one direction with respect to the sleeve member after entry, a cage mounted within said sleeve member for longitudinal sliding movement therein, means for restraining said cage against rotation with respect to said sleeve member, spring means for urging said cage toward the open end of said sleeve member, a spindle within said cage, spring means interconnecting said spindle and cage for rotating said spindle with respect to said cage, said spindle being adapted when in lowermost position to be engaged by said pin member during entry of the latter into the sleeve member, cooperating interengaging elements on the juxtaposed ends of said pin member and said spindle, respectively, for preventing relative rotation therebetween, cooperating stop means on said spindle and said sleeve, respectively, for preventing rotation of said spindle by said spring when said cage is in outermost position, said stop means being disengaged in response to inward movement of said cage and spindle by said pin member whereby said spring within said cage rotates said spindle and pin member with respect to the sleeve member to interengage said shoulders in response to full entry of said pin member into the sleeve member.

GLYNN H. WILLIAMS.